US011339899B2

(12) United States Patent
Montanari et al.

(10) Patent No.: US 11,339,899 B2
(45) Date of Patent: May 24, 2022

(54) MULTILAYER TUBULAR STRUCTURE HAVING BETTER RESISTANCE TO EXTRACTION IN BIOFUEL AND USE THEREOF

(71) Applicant: Arkema France, Colombes (FR)

(72) Inventors: Thibaut Montanari, Menneval (FR); Christelle Recoquille, Nassandres (FR); Bertrand Verbauwhede, Aclou (FR); Nicolas Dufaure, Bernay (FR); Florent Dechamps, Saint Romain de Colbose (FR)

(73) Assignee: Arkema France, Colombes (FR)

( * ) Notice: Subject to any disclaimer, the term of this patent is extended or adjusted under 35 U.S.C. 154(b) by 59 days.

(21) Appl. No.: 15/558,358

(22) PCT Filed: Jan. 12, 2017

(86) PCT No.: PCT/FR2017/050066
§ 371 (c)(1),
(2) Date: Sep. 14, 2017

(87) PCT Pub. No.: WO2017/121961
PCT Pub. Date: Jul. 20, 2017

(65) Prior Publication Data
US 2018/0080583 A1 Mar. 22, 2018

(30) Foreign Application Priority Data
Jan. 15, 2016 (FR) .................................... 1650337

(51) Int. Cl.
| | | |
|---|---|---|
| *B32B 1/08* | (2006.01) | |
| *F16L 11/04* | (2006.01) | |
| *F16L 11/12* | (2006.01) | |
| *B32B 27/34* | (2006.01) | |
| *B32B 27/08* | (2006.01) | |
| *B32B 27/22* | (2006.01) | |
| *B32B 27/30* | (2006.01) | |
| *B32B 27/18* | (2006.01) | |
| *B32B 27/32* | (2006.01) | |
| *B32B 27/28* | (2006.01) | |
| *C08L 77/06* | (2006.01) | |
| *C08L 77/02* | (2006.01) | |

(52) U.S. Cl.
CPC .............. *F16L 11/045* (2013.01); *B32B 1/08* (2013.01); *B32B 27/08* (2013.01); *B32B 27/18* (2013.01); *B32B 27/22* (2013.01); *B32B 27/286* (2013.01); *B32B 27/304* (2013.01); *B32B 27/306* (2013.01); *B32B 27/322* (2013.01); *B32B 27/34* (2013.01); *C08L 77/02* (2013.01); *C08L 77/06* (2013.01); *F16L 11/125* (2013.01); B32B 2307/7265 (2013.01); B32B 2597/00 (2013.01); B32B 2605/08 (2013.01); *F16L 11/04* (2013.01); *F16L 2011/047* (2013.01); *Y10T 428/1393* (2015.01)

(58) Field of Classification Search
CPC ...... C08L 2205/02; C08L 77/02; C08L 77/04; C08L 77/06; C09J 177/00; C09J 177/02; C09J 177/04; C09J 177/06; C09J 177/08; C09J 177/10; Y10T 428/1397; F16L 11/045; F16L 11/047; F16L 11/12; F16L 11/127
USPC .............................................. 428/36.9, 36.91
See application file for complete search history.

(56) References Cited

U.S. PATENT DOCUMENTS

| | | |
|---|---|---|
| 5,076,329 A | 12/1991 | Brunnhofer |
| 5,474,822 A | 12/1995 | Röber et al. |
| 5,512,342 A | 4/1996 | Röber et al. |
| 5,554,426 A | 9/1996 | Röber et al. |
| 6,177,162 B1 | 1/2001 | Siour et al. |
| 6,267,148 B1 * | 7/2001 | Katayama ............... B32B 27/18 138/137 |
| 6,555,243 B2 | 4/2003 | Flepp et al. |
| 7,132,073 B2 | 11/2006 | Inaba et al. |

(Continued)

FOREIGN PATENT DOCUMENTS

| | | |
|---|---|---|
| DE | 10 2008 044 224 A1 | 6/2010 |
| EP | 0 428 833 A2 | 5/1991 |

(Continued)

OTHER PUBLICATIONS

Wypych, George, Handbook of Plasticizers, 2004, ChemTec Publishing, Toronto-New York, p. 298-299 (Year: 2004).*

(Continued)

*Primary Examiner* — Lee E Sanderson
(74) *Attorney, Agent, or Firm* — RatnerPrestia

(57) ABSTRACT

A multilayer tubular structure (MLT) for transport of alcohol-containing petrol. The MLT from the outside inwards has at least one barrier layer and at least one inner layer located below the barrier layer. The inner layer, or all the layers contain on average at most 1.5% of plasticizer relative to the total weight of the composition of each layer or to the total weight of all the compositions of the layers. The inner layer is predominantly made of at least one polyamide having more than 75% aliphatic units. The aliphatic polyamide has a mean number of carbon atoms per nitrogen atom selected from the following:

A: from 4 to 8.5;
B: from 7 to 10;
C: from 9 to 18;

with the proviso that when the inner layer comprises at least three polyamides, at least one of the polyamides A, B and C is excluded.

10 Claims, No Drawings

(56) References Cited

U.S. PATENT DOCUMENTS

| | | | |
|---|---|---|---|
| 7,175,896 B2 | 2/2007 | Schmitz et al. | |
| 8,133,561 B2 | 3/2012 | Schmitz et al. | |
| 8,784,526 B2 | 7/2014 | Brule et al. | |
| 9,057,466 B2 | 6/2015 | Dowe et al. | |
| 9,346,988 B2 | 5/2016 | Ferreiro et al. | |
| 2002/0012806 A1* | 1/2002 | Flepp | B32B 27/34 428/474.9 |
| 2002/0155242 A1* | 10/2002 | Bellet | F16L 11/06 428/36.91 |
| 2003/0124288 A1* | 7/2003 | Merziger | B32B 1/08 428/36.91 |
| 2003/0220449 A1* | 11/2003 | Jacques | C08L 77/06 525/178 |
| 2004/0105946 A1* | 6/2004 | Katayama | C08L 67/02 428/36.9 |
| 2004/0126523 A1† | 7/2004 | Masuda | |
| 2005/0025920 A1† | 2/2005 | Stolarz | |
| 2005/0031818 A1* | 2/2005 | Micheneau | F16L 9/125 428/36.91 |
| 2007/0059469 A1* | 3/2007 | Amouroux | B32B 1/08 428/36.91 |
| 2007/0148389 A1† | 6/2007 | Nishioka | |
| 2008/0057246 A1† | 3/2008 | Schwitter | |
| 2008/0317986 A1† | 12/2008 | Schmitz | |
| 2009/0252979 A1† | 10/2009 | Ferreiro | |
| 2009/0269532 A1* | 10/2009 | Ferreiro | B32B 27/18 428/36.91 |
| 2010/0166995 A1* | 7/2010 | Sato | F16L 11/04 428/36.91 |
| 2013/0126031 A1 | 5/2013 | Sont et al. | |
| 2013/0240041 A1† | 9/2013 | Brule | |
| 2014/0246111 A1* | 9/2014 | Zimmer | F16L 11/045 138/140 |
| 2014/0299220 A1† | 10/2014 | Montanari | |
| 2016/0124343 A1 | 7/2016 | Nakamura et al. | |
| 2017/0074427 A1* | 3/2017 | Rosenberg | B32B 27/34 |
| 2017/0261133 A1† | 9/2017 | Nakamura | |
| 2017/0283556 A1 | 10/2017 | Ebata et al. | |
| 2017/0348941 A1* | 12/2017 | Sato | B32B 27/22 |
| 2018/0142090 A1* | 5/2018 | Tsunenishi | B32B 1/08 |

FOREIGN PATENT DOCUMENTS

| | | | | |
|---|---|---|---|---|
| EP | 1 162 061 A1 | 12/2001 | | |
| EP | 1 216 826 A2 | 6/2002 | | |
| EP | 1 270 209 A1 | 1/2003 | | |
| EP | 1 283 101 A1 | 2/2003 | | |
| EP | 1 393 889 A1 | 3/2004 | | |
| EP | 1 452 307 A1 | 9/2004 | | |
| EP | 1452307 A1 † | 9/2004 | | |
| EP | 1 496 298 A2 | 1/2005 | | |
| EP | 1710482 A1 | 10/2006 | | |
| EP | 2 098 580 A1 | 9/2009 | | |
| EP | 2094481 B1 | 11/2011 | | |
| EP | 2697055 B1 | 5/2014 | | |
| EP | 3192650 A1 | 7/2017 | | |
| FR | 2 925 865 | 7/2009 | | |
| FR | 2925865 A1 * | 7/2009 | | B32B 1/08 |
| JP | H-08-247345 A | 9/1996 | | |
| JP | 2003-094540 A | 4/2003 | | |
| JP | 2014240139 A | 12/2014 | | |
| JP | 2015-054433 A | 3/2015 | | |
| JP | 2015104830 A | 6/2015 | | |
| JP | 2016-083908 A | 5/2016 | | |
| WO | 2006040206 A1 | 4/2006 | | |

OTHER PUBLICATIONS

Third Party Submissions Under 37 CFR 1.290, filed Aug. 3, 2018, 13 pages.
Third Party Observation for Application No. EP20170712187, dated Aug. 31, 2018, 7 pages.
Third party Observation for Application No. EP20170712187, dated Aug. 31, 2018, 3 pages.
Final Office Action for U.S. Appl. No. 15/558,365, dated Jan. 31, 2020, 12 pages.
Non Final Office Action for U.S. Appl. No. 16/713,807, dated Jun. 10, 2020, 21 pages.
Notice of Allowance for Application No. 16/713,807, dated Aug. 12, 2020, 8 pages.
Non Final Office Action for U.S. Appl. No. 15/558,365, dated Oct. 19, 2020, 25 pages.
International Search Report for Application No. PCT/FR2017/050066, dated Jun. 26, 2017.
Final Office Action for U.S. Appl. No. 15/558,365, dated Mar. 12, 2021, 15 pages.
Non Final Office Action for U.S. Appl. No. 16/744,906, dated Mar. 31, 2021, 60 pages.
Japanese Office Action for Japanese Application No. 2017-548959 dated May 15, 2018.

\* cited by examiner
† cited by third party

MULTILAYER TUBULAR STRUCTURE HAVING BETTER RESISTANCE TO EXTRACTION IN BIOFUEL AND USE THEREOF

CROSS-REFERENCE TO RELATED APPLICATIONS

This is the national phase of International Application No. PCT/FR2017/050066, filed 12 Jan. 2017, which claims priority to French Application No. 1650337, filed 15 Jan. 2016. The disclosure of each of these applications is incorporated herein by reference in its entirety for all purposes.

FIELD OF INVENTION

The invention relates to a multilayer structure, in particular in the form of a tube, and the use thereof for transporting fluids, in particular fuel of petrol type, especially alcohol-containing petrol, in particular for motor vehicles.

The invention more particularly relates to the tubes present within an engine. These tubes may for example be intended for the transport of fuels, especially between the tank and the engine, for the cooling circuit, for the hydraulics system, or else intended for the air conditioning circuit or the transport of urea/water mixture.

BACKGROUND OF INVENTION

For the transport of petrol, and in particular of bio-petrol, numerous criteria must be met, in particular good barrier properties (for environmental protection reasons), cold impact, pressure resistance, etc.

For reasons of safety and environmental conservation, especially with the advent of new biofuels, car manufacturers are demanding particular mechanical characteristics for the abovementioned tubes, and also characteristics of very low permeability and good resistance to the different constituents of the fuels, the latter varying depending on the country (hydrocarbons, additives, alcohols such as methanol and ethanol, alcohols possibly being predominant components in some cases), to engine lubrication oils, and to other chemical products liable to be encountered in this environment (battery acids, brake fluids, coolant liquids, metal salts such as zinc or calcium chloride).

The characteristics of the specifications commonly required by car manufacturers for a tube to be deemed satisfactory are, cumulatively, the following:
good, lasting adhesion between the layers, if the tube is a multilayer tube, most particularly after having been exposed to the fuel;
good integrity of the connections (tubes with connectors) after circulation of the fuel, that is to say not leading to any leakage;
good dimensional stability of the tube when it is used with petrol;
good impact resistance under cold conditions (from −30° C. to −40° C. approximately), such that the tube does not shatter;
good heat resistance (approximately 150° C.), such that the tube does not deform;
good resistance to ageing in a hot oxidative medium (for example: hot air from the engine compartment, from 100 to 150° C. approximately);
good resistance to fuels and to their degradation products, and especially with high peroxide contents;
very low permeability to fuels, and more particularly good barrier properties to biofuels, both for the polar components thereof (such as ethanol) and for the apolar components thereof (hydrocarbons);
good flexibility of the tube to facilitate assembly, especially of the fuel supply pipe;
good resistance to $ZnCl_2$ (for example in winter when the roads have been gritted, the outside of the tube being exposed to this environment).

Moreover, the desired tubes must avoid the following drawbacks:
if the tube is a multilayer tube, the delamination of the layers, especially the inner layers, especially during connector insertion (which may lead to leakages);
excessive swelling of the tube after ageing in petrol/diesel systems (including for biodiesels or bio-petrols), which may lead to leakages or problems of positioning under the vehicle.

Recently, a new problem has appeared, namely the excess of extractable matter from the multilayer tube following prolonged contact with the alcohol-containing petrol. This extractable matter is liable to block or clog the injectors of the vehicle engines. Car manufacturers, in particular Volkswagen, have therefore established new criteria for selecting tubes able to transport petrol, especially alcohol-containing petrol, in motor vehicles, which are stricter than they used to be. Thus, the new test developed by different manufacturers, especially Volkswagen, consists in determining the proportion of extractables of a petrol transport tube after bringing the inside thereof into contact with hot alcohol-containing petrol for several hours and weighing the evaporation residue of the petrol contained within the tube, corresponding to the extractables. The tube tested may thus only be used for transporting petrol if the proportion of extractables is as low as possible, in particular less than or equal to 6 $g/m^2$ (of tube inner surface area).

Currently, there are two types of tubes: single-layer and multilayer tubes, that is to say consisting of one or more layers of polymer. For the transport of petrol, in particular, the use of a multilayer tube comprising a barrier layer is tending to become widespread for ecological reasons.

Conventionally, the tubes used are produced by monoextrusion, if it is a single-layer tube, or by coextrusion of the different layers, if it is a multilayer tube, according to customary techniques for transforming thermoplastics.

The structures (MLT) for transporting petrol typically consist of a barrier layer such as EVOH, surrounded on both sides by a PA layer (at least one layer) and optionally comprising layers of binders in the event that the adhesion between the other layers proves insufficient.

Thus, patent EP 2098580 especially describes tubes having an EVOH barrier and at least two layers of polyamides, plasticized or unplasticized, one being located above the barrier layer and the other being located below the barrier layer.

Nonetheless, this type of structure, and also other MLTs known to those skilled in the art, are no longer suited to the abovementioned new test for extractables.

SUMMARY OF THE INVENTION

The present invention aims to solve this new problem by a specific arrangement and composition of the layers of the multilayer structure.

The present invention relates to a multilayer tubular structure (MLT) intended for the transport of fluids, in particular of petrol, especially alcohol-containing petrol, comprising, from the outside inwards, at least one barrier layer (1) and at least one inner layer (2) located below the barrier layer, said inner layer (2), or all the layers (2) and the other optional layers located below the barrier layer, containing on average from 0 to 1.5% by weight of plasticizer relative to the total weight of the composition of the layer (2) or to the total weight of all the compositions of the layers (2) and the other optional layers located below the barrier layer, respectively, said inner layer (2) predominantly comprising at least one polyamide of aliphatic type or consisting of more than 75% of aliphatic units, said aliphatic polyamide being chosen from:

a polyamide denoted A, having a mean number of carbon atoms per nitrogen atom, denoted $C_A$, of from 4 to 8.5, advantageously from 4 to 7;

a polyamide denoted B, having a mean number of carbon atoms per nitrogen atom, denoted $C_B$, of from 7 to 10, advantageously from 7.5 to 9.5;

a polyamide denoted C, having a mean number of carbon atoms per nitrogen atom, denoted $C_C$, of from 9 to 18, advantageously from 10 to 18;

with the proviso that when said inner layer (2) comprises at least three polyamides, at least one of said polyamides A, B and C is excluded.

It would not be a departure from the context of the invention if the subject, intended for transporting fluid, also served for storing fluids.

DETAILED DESCRIPTION OF THE INVENTION

The term "fluid" denotes a gas used in a motor vehicle, or a liquid, in particular a liquid, and especially an oil, a brake fluid, a urea solution, a glycol-based coolant liquid, fuels, especially light fuels liable to pollute, advantageously fuels other than diesel, especially petrol or LPG, in particular petrol and more particularly alcohol-containing petrol.

Air, nitrogen and oxygen are excluded from the definition of said gas.

Advantageously, said fluid denotes fuels, in particular petrol, especially alcohol-containing petrol.

The term "petrol" denotes a mixture of hydrocarbons originating from the distillation of petroleum, to which may be added additives or alcohols such as methanol or ethanol, alcohols possibly being predominant components in some cases.

The expression "alcohol-containing petrol" denotes a petrol to which methanol or ethanol have been added. It also denotes an E95 type petrol, which does not contain any petroleum distillation products.

The expression "all the layers (2) and the other optional layers located below the barrier layer" means all the layers present, located below the barrier layer.

The expression "barrier layer" denotes a layer having characteristics of low permeability and of good resistance to the various constituents of the fluids, especially the fuels, that is to say that the barrier layer slows the passage of the fluid, especially of the fuel, both in terms of the polar components thereof (such as ethanol) and the apolar components thereof (hydrocarbons) into the other layers of the structure or even to the outside of the structure. The barrier layer is therefore a layer which first and foremost makes it possible not to lose too much petrol into the atmosphere by diffusion, thereby making it possible to avoid atmospheric pollution.

These barrier materials may be polyamides with a low carbon content, that is to say in which the mean number of carbon atoms (C) relative to the nitrogen atom (N) is less than 9, which are preferably semicrystalline and have a high melting point, polyphthalamides, and/or also non-polyamide barrier materials such as highly crystalline polymers such as the copolymer of ethylene and vinyl alcohol (denoted EVOH hereinafter), or even functionalized fluoro materials such as functionalized polyvinylidene fluoride (PVDF), the functionalized copolymer of ethylene and tetrafluoroethylene (ETFE), the functionalized copolymer of ethylene, tetrafluoroethylene and hexafluoropropylene (EFEP), functionalized polyphenylene sulphide (PPS) or functionalized polybutylene naphthalate (PBN). If these polymers are not functionalized, then it is possible to add an intermediate layer of binder to ensure good adhesion within the MLT structure.

Among these barrier materials, EVOHs are particularly beneficial, especially those containing the most vinyl alcohol comonomer, and also those which have been impact-modified, since they make it possible to produce less fragile structures.

The inventors have thus found that the absence of, or at least a very small proportion of, plasticizer in the inner layer(s), that is to say the layer(s) located under the barrier layer, made it possible to greatly reduce the proportion of extractables as determined by a test as defined above, and in particular by a test which consists in filling a tubular structure with alcohol-containing petrol of FAM B type and in heating everything at 60° C. for 96 hours, then in emptying it by filtering it into a beaker, then in leaving the filtrate of the beaker to evaporate at room temperature, to finally weigh this residue, the proportion of which must be less than or equal to approximately 6 g/m2 of tube inner surface area.

The alcohol-containing petrol FAM B is described in standards DIN 51604-1: 1982, DIN 51604-2: 1984 and DIN 51604-3: 1984.

Briefly, the alcohol-containing petrol FAM A is firstly prepared with a mixture of 50% of toluene, 30% of isooctane, 15% of diisobutylene and 5% of ethanol then FAM B is prepared by mixing 84.5% of FAM A with 15% of methanol and 0.5% of water.

FAM B consists in total of 42.3% of toluene, 25.4% of isooctane, 12.7% of diisobutylene, 4.2% of ethanol, 15% of methanol and 0.5% of water.

When a single layer (2) is present, the latter is in contact with the fluid.

In the event that several layers (2) are present, it is possible that one of the inner layers has a proportion of plasticizer greater than 1.5% by weight, but in this case the proportion of plasticizer beyond 1.5% is compensated by the thickness of the layer which is then much thinner, such that the mean value of plasticizer present in all the inner layers does not exceed 1.5%. The proportion of plasticizer in this layer may then be up to 15%, but its thickness does not then exceed 10% of the total thickness of the tube; preferably, it does not exceed 100 μm.

This much thinner layer may be either directly in contact with the barrier layer, or the innermost layer which is then in contact with the fluid.

The expression "said inner layer (2) predominantly comprising at least one polyamide of aliphatic type" means that said polyamide of aliphatic type is present in a proportion of more than 50% by weight in the layer (2). The polyamide of aliphatic type is linear and is not of cycloaliphatic type.

Advantageously, said predominant polyamide of aliphatic type of the layer(s) (2) also predominantly comprises aliphatic units, namely more than 50% of aliphatic units.

Advantageously, said predominant polyamide of aliphatic type of the layer(s) (2) consists of more than 75% of aliphatic units; preferably said predominant polyamide of aliphatic type of the layer(s) (2) is totally aliphatic.

Among these barrier materials, PPAs are also beneficial, especially coPA6T, PA9T and the copolymers thereof, and PA10T and the copolymers thereof.

According to the present application, the term "polyamide", also denoted "PA", covers:
homopolymers,
copolymers, or copolyamides, based on various amide units, such as, for example, copolyamide 6/12 with amide units derived from lactam 6 and lactam 12,
alloys of polyamides, as long as the polyamide is the predominant constituent.

There is also a category of copolyamides in the broad sense, which, while not preferred, form part of the context of the invention. These are copolyamides comprising not only amide units (which will be predominant, hence the fact that they are to be considered as copolyamides in the broad sense), but also units which are not amide in nature, for example ether units. The most well known examples are PEBAs or polyether-block-amides, and the copolyamide-ester-ether, copolyamide-ether and copolyamide-ester variants thereof. Among these, mention will be made of PEBA-12, in which the polyamide units are the same as those of PA12, and PEBA-6.12, in which the polyamide units are the same as those of PA6.12.

Homopolyamides, copolyamides and alloys are also distinguished from one another by their number of carbon atoms per nitrogen atom, with the knowledge that there are as many nitrogen atoms as amide groups (—CO—NH—).

A polyamide with a high carbon content is a polyamide with a high content of carbon atoms (C) relative to the nitrogen atom (N). These are polyamides with approximately at least 9 carbon atoms per nitrogen atom, such as, for example, polyamide-9, polyamide-12, polyamide-11, polyamide-10.10 (PA10.10), copolyamide 12/10.T, copolyamide 11/10.T, polyamide-12.T, and polyamide-6.12 (PA6.12). T represents terephthalic acid.

The nomenclature used to define polyamides is described in the standard ISO 1874-1:1992 "Plastics—Polyamide (PA) molding and extrusion materials—Part 1: Designation", especially on page 3 (tables 1 and 2), and is well known to those skilled in the art.

A polyamide with a low carbon content is a polyamide with a low content of carbon atoms (C) relative to the nitrogen atom (N). These are polyamides with approximately less than 9 carbon atoms per nitrogen atom, such as, for example, polyamide-6, polyamide-6.6, polyamide-4.6, copolyamide-6.T/6.6, copolyamide 6.I/6.6, copolyamide 6.T/6.I/6.6, and polyamide 9.T. I represents isophthalic diacid.

In the case of a homopolyamide of PA-X.Y type, with X denoting a unit obtained from a diamine and Y denoting a unit obtained from a diacid, the number of carbon atoms per nitrogen atom is the mean of the numbers of carbon atoms present in the unit derived from the diamine X and in the unit derived from the diacid Y. Thus, PA6.12 is a PA with 9 carbon atoms per nitrogen atom, in other words a C9 PA. PA6.13 is C9.5.

In the case of the copolyamides, the number of carbon atoms per nitrogen atom is calculated according to the same principle. The calculation is made on a molar pro rata basis of the various amide units. In the case of a copolyamide having units not of amide type, the calculation is only made on the amide unit portion. Thus, for example, for PEBA-12, which is a block copolymer of 12 amide units and of ether units, the mean number of carbon atoms per nitrogen atom will be 12, as for PA12; for PEBA-6.12, it will be 9, as for PA6.12.

Thus, polyamides with a high carbon content such as the polyamide PA12 or 11, adhere with difficulty to an EVOH polymer, to a polyamide with a low carbon content such as the polyamide PA6, or else to an alloy of polyamide PA6 and polyolefin (such as, for example, an Orgalloy® sold by Arkema).

Nonetheless, it is observed that the currently proposed tube structures are unsatisfactory for a use intended for biofuels, since the demands of the car manufacturers' specifications, recalled above, cannot all be simultaneously met.

Biofuels are not solely derived from petroleum but comprise a proportion of polar products such as alcohols of plant origin, such as ethanol or methanol, of at least 3%. This content may be as high as 85% or even 95%.

In addition, the circulation temperature of the fuel tends to rise, due to the new engines (more confined, operating at a higher temperature).

In one advantageous embodiment, said inner layer (2), or each of the layers (2) and the other optional layers located below the barrier layer, contains from 0 to 1.5% by weight of plasticizer relative to the total weight of the composition of the layer (2) or to the total weight of each of the compositions of the layers (2) and the other optional layers located below the barrier layer, respectively.

In one advantageous embodiment, in the multilayer tubular structure (MLT) as defined above, said inner layer (2), or each of the layers (2) and the other optional layers located below the barrier layer, does not (do not) contain plasticizer.

In this embodiment, all the layers located below the barrier layer do not contain any plasticizer at all and consist of one of the preferred structures of the invention.

In one advantageous embodiment, the present invention relates to a multilayer tubular structure (MLT) as defined above, in which at least one layer (3) further outwards, located above the barrier layer, is present, said outer layer (3) predominantly comprising at least one polyamide of aliphatic type or consisting of more than 75% of aliphatic units, in particular said aliphatic polyamide having a mean number of carbon atoms per nitrogen atom of from 9.5 to 18, advantageously from 11 to 18.

The expression "said outer layer (3) predominantly comprising at least one polyamide of aliphatic type" means that said polyamide of aliphatic type is present in a proportion of more than 50% by weight in the layer (3). The polyamide of aliphatic type is linear and is not of cycloaliphatic type.

Advantageously, said predominant polyamide of aliphatic type of the layer(s) (3) also predominantly comprises aliphatic units, namely more than 50% of aliphatic units.

Advantageously, said predominant polyamide of aliphatic type of the layer(s) (3) consists of more than 75% of aliphatic units; preferably said predominant polyamide of aliphatic type of the layer(s) (3) is totally aliphatic.

Advantageously, said predominant polyamide of aliphatic type of the layer(s) (2) and of the layer(s) (3) also predominantly comprises aliphatic units, namely more than 50% of aliphatic units.

Advantageously, said predominant polyamide of aliphatic type of the layer(s) (2) and of the layer(s) (3) consists of more than 75% of aliphatic units; preferably said predominant polyamide of aliphatic type of the layer(s) (2) and of the layer(s) (3) is totally aliphatic.

Advantageously, the present invention relates to a multilayer tubular structure (MLT) as defined above, in which said outer layer (3) comprises from 0 to 15% of plasticizer relative to the total weight of the composition of the layer (3), or in which all the outer layers comprise on average from 0 to 5% of plasticizer.

It is possible to have a greater proportion of plasticizer in the outer layer(s), that is to say the layer(s) located above the barrier layer, without significantly increasing the proportion of extractables.

As already indicated above for the layers (2), in the event that several layers (3) are present, it is possible that one of the outer layers has a greater proportion of plasticizer, such as 15% by weight, but in this case the proportion of plasticizer is compensated by the thickness of the layer which is then much thinner, such that the mean value of plasticizer present in all the outer layers does not exceed 5%. The proportion of plasticizer in this layer may then be up to 15%, but its thickness does not exceed 20% of the total thickness of the tube; preferably, it does not exceed 200 µm.

Advantageously, the present invention relates to a multilayer tubular structure (MLT) as defined above, in which at least one second outer layer (3') located above the barrier layer is present, and is preferably located above the layer (3), said layer (3') being plasticized, said plasticizer being in particular present in a proportion from 1.5% to 15% by weight relative to the total weight of the composition of said layer, the thickness of said layer (3') preferably represents up to 20% of the total thickness of the tubular structure, in particular up to 200 µm.

The layer (3'), just like the layer (3), predominantly comprises a polyamide of aliphatic type, that is to say that said polyamide of aliphatic type is present in a proportion of more than 50% by weight in the layer (3'). The polyamide of aliphatic type is linear and is not of cycloaliphatic type.

Advantageously, said predominant polyamide of aliphatic type of the layer(s) (3') also predominantly comprises aliphatic units, namely more than 50% of aliphatic units.

Advantageously, said predominant polyamide of aliphatic type of the layer(s) (3') consists of more than 75% of aliphatic units; preferably said predominant polyamide of aliphatic type of the layer(s) (3') is totally aliphatic.

In another embodiment, the present invention relates to a multilayer tubular structure (MLT), in which the layer(s) (3) comprise(s) up to 1.5% by weight of plasticizer relative to the total weight of the composition of said layer or of all the compositions of the layers (3).

Advantageously, the multilayer tubular structure (MLT) comprises a single layer (3) and does not contain plasticizer.

Advantageously, the multilayer tubular structure (MLT) comprises a single layer (3) and a single layer (2), the layers (2) and (3) containing no plasticizer.

In another embodiment, the present invention relates to a multilayer tubular structure (MLT), in which the plasticizer content of all the layers located above the barrier layer is at most 5% by weight relative to the total weight of the compositions of all the layers located above the barrier layer.

In another embodiment, the present invention relates to a multilayer tubular structure (MLT), in which the layer (3') is the outermost layer and the only layer which is plasticized, the layer(s) (3) not containing plasticizer.

The proportion of plasticizer may represent up to 15% by weight of the total weight of the composition of the layer (3'). The greater the proportion of plasticizer, the thinner the layer (3') will be, with a thickness of said layer (3') which preferably represents up to 20% of the total thickness of the tubular structure, in particular up to 200 µm.

Advantageously, the multilayer tubular structure (MLT) consists of four layers, from the outside inwards, (3')//(3)//(1)//(2), the layer (3') being the only plasticized layer, in proportions as defined above, the layer (3) and the layer (2) containing no plasticizer.

A multilayer tubular structure (MLT) consisting of four layers, from the outside inwards, (3')//(3)//(1)//(2), has the advantage of having an elongation at break, at t=0 when the structure is very dry and with a very low degree of humidity of between 0 and 30% relative humidity, which is very good, and especially better than a structure in which the layers (3'), (3) and (2) do not contain plasticizer.

Advantageously, in the latter embodiment, the layer (3') is the outermost layer and the polyamide of the latter is a long-chain polyamide, i.e. a mean number of carbon atoms per nitrogen atom, denoted Cc, of from 9.5 to 18, the layer (3) is located between the barrier layer and the layer (3') and the polyamide of this layer (3) is a short-chain polyamide, i.e. a mean number of carbon atoms per nitrogen atom, denoted Ca, of from 4 to 9.

Advantageously, in the latter embodiment, with the layer (3') at a thickness of from 100 to 200 µm, the layer (3) has a thickness of at least 200 µm and the layer (1) has a thickness of from 100 to 200 µm.

Advantageously, in the latter embodiment, the layer (3') is the outermost layer and the polyamide of the latter is a long-chain polyamide, i.e. a mean number of carbon atoms per nitrogen atom, denoted Cc, of from 9.5 to 18, the layer (3) is located between the barrier layer and the layer (3') and the polyamide of this layer (3) is a short-chain polyamide, i.e. a mean number of carbon atoms per nitrogen atom, denoted Ca, of from 4 to 9, with the layer (3') at a thickness of from 100 to 200 µm, the layer (3) has a thickness of at least 200 µm and the layer (1) has a thickness of from 100 to 200 µm.

Advantageously, the multilayer tubular structure (MLT) consists of five layers, from the outside inwards, (3')//(3)//(1)//(2)//(2'), the layer (3') being the only plasticized layer, in proportions as defined above, the layer (3) and the layers (2) and (2') containing no plasticizer, the layer (2') being a polyamide as defined for the layer (2) but different from that of the layer (2). This type of structure makes it possible to increase the elongation at break under very low humidity conditions, without excessively stiffening the structure.

Regardless of the number of layers: three, four, five or more, the preferred tubular structures are those containing as little plasticizer as possible, and preferably the least amount of plasticizer in the innermost layers, that is to say the layers closest to the fluid. These structures may be the following:

- Multilayer tubular structure (MLT) containing no more than 1.5% of plasticizer in the first 50% of the thickness thereof, starting from the inner face in contact with the fluid.
- Multilayer tubular structure (MLT) containing no more than 1.5% of plasticizer in the first 75% of the thickness thereof, starting from the inner face in contact with the fluid.
- Multilayer tubular structure (MLT) containing no more than 1.5% of plasticizer in the first 85% of the thickness thereof, starting from the inner face in contact with the fluid.
- Multilayer tubular structure (MLT) containing no plasticizer in the first 50% of the thickness thereof, starting from the inner face in contact with the fluid.

Multilayer tubular structure (MLT) containing no plasticizer in the first 75% of the thickness thereof, starting from the inner face in contact with the fluid.

Multilayer tubular structure (MLT) containing no plasticizer in the first 85% of the thickness thereof, starting from the inner face in contact with the fluid.

In another embodiment, the present invention relates to a multilayer tubular structure (MLT) as defined above, in which at least one layer (4) is present, said layer (4) containing no more than 15% by weight of plasticizer, preferably no more than 1.5% by weight of plasticizer relative to the total weight of the constituents of the layer (4); advantageously, the layer (4) does not contain plasticizer, said layer (4) predominantly comprising at least one polyamide of aliphatic type or consisting of more than 75% of aliphatic units, said aliphatic polyamide being chosen from:

a polyamide denoted A, having a mean number of carbon atoms per nitrogen atom, denoted CA, of from 4 to 8.5, advantageously from 4 to 7;

a polyamide denoted B, having a mean number of carbon atoms per nitrogen atom, denoted CB, of from 7 to 10, advantageously from 7.5 to 9.5;

a polyamide denoted C, having a mean number of carbon atoms per nitrogen atom, denoted CC, of from 9 to 18, advantageously from 10 to 18;

with the proviso that when said layer (4) comprises at least three polyamides, at least one of said polyamides A, B and C is excluded, said layer (4) being located between the barrier layer (1) and the inner layer (2) and/or between the outer layer (3) and the barrier layer (1);

or said layer (4) is a layer of binder, the thickness of which represents up to 15% of the structure (MLT).

The layer (4), when it is not a layer of binder, is a polyamide of aliphatic type as defined for the layers (2), (3) and (3').

Advantageously, the tubular structure of the invention is a four-layer structure consisting, from the outside inwards, of the following layers: (3)//(4)//(1)//(2), the layer (3) being plasticized up to 15% as above, and thin, and the layer (4), when it is different from the layer of binder as defined above, does not contain plasticizer; nor does the layer (2).

Advantageously, the tubular structure of the invention is a four-layer structure consisting, from the outside inwards, of the following layers: (3)//(1)//(4)//(2), the layer (3) being plasticized up to 15% by weight as above, and preferably thin, and the layer (4), when it is different from the layer of binder as defined above, does not contain plasticizer; nor does the layer (2).

Nonetheless, this layer (3) plasticized up to 15% by weight must not be too thin, otherwise the barrier layer is not central enough and the MLT structure risks not being good enough in terms of impact. On the other hand, it may be very thin if there is an additional thick (non-plasticized) layer between the layer (3) and the layer (1), such that the layer (1) is not too off-centre.

Another layer (2') and/or a layer (3') may also be present in these two types of four-layer structures.

Said layer (4) may also be a binder as described, in particular, in patents EP 1452307 and EP1162061, EP 1216826 and EP0428833.

It is implicit that the layers (3) and (1) or (1) and (2) adhere to one another. The layer of binder is intended to be interposed between two layers which do not adhere, or which adhere with difficulty, to one another.

The binder may be, for example, but without being limited thereto, a composition based on 50% of copolyamide 6/12 (70/30 weight ratio), of Mn 16 000, and on 50% copolyamide 6/12 (30/70 weight ratio), of Mn 16 000, a composition based on PP (polypropylene) grafted with maleic anhydride, known under the name Admer QF551A by Mitsui, a composition based on PA610 (of Mn 30 000, and as defined elsewhere) and on 36% of PA6 (of Mn 28 000) and on 1.2% of organic stabilizers (consisting of 0.8% of phenol Lowinox 44625 from Great Lakes, of 0.2% of phosphite Irgafos 168 from Ciba, of 0.2% of UV stabilizer Tinuvin 312 from Ciba), a composition based on PA612 (of Mn 29 000, and as defined elsewhere) and on 36% of PA6 (of Mn 28 000, and as defined elsewhere) and on 1.2% of organic stabilizers (consisting of 0.8% of phenol Lowinox 44B25 from Great Lakes, of 0.2% of phosphite Irgafos 168 from Ciba, of 0.2% of UV stabilizer Tinuvin 312 from Ciba), a composition based on PA610 (of Mn 30 000, and as defined elsewhere) and on 36% of PA12 (of Mn 35 000, and as defined elsewhere) and on 1.2% of organic stabilizers (consisting of 0.8% of phenol Lowinox 44B25 from Great Lakes, of 0.2% of phosphite Irgafos 168 from Ciba, of 0.2% of UV stabilizer Tinuvin 312 from Ciba), a composition based on 40% PA6 (of Mn 28 000, and as defined elsewhere), on 40% of PA12 (of Mn 35 000, and as defined elsewhere) and on 20% of functionalized EPR Exxelor VA1801 (Exxon) and on 1.2% of organic stabilizers (consisting of 0.8% of phenol Lowinox 44B25 from Great Lakes, of 0.2% of phosphite Irgafos 168 from Ciba, of 0.2% of UV stabilizer Tinuvin 312 from Ciba) or else a composition based on 40% PA6.10 (of Mn 30 000, and as defined elsewhere), on 40% of PA6 (of Mn 28 000, and as defined elsewhere) and on 20% of impact modifier of ethylene/ethyl acrylate/anhydride type in the weight ratio 68.5/30/1.5 (MFI 6 at 190° C. under 2.16 kg), and on 1.2% of organic stabilizers (consisting of 0.8% of phenol Lowinox 44B25 from Great Lakes, of 0.2% of phosphite Irgafos 168 from Ciba, of 0.2% of UV stabilizer Tinuvin 312 from Ciba).

In another embodiment, the present invention relates to a multilayer tubular structure (MLT) as defined above, in which a layer (4') is present, said layer (4') predominantly comprising at least one polyamide of aliphatic type or consisting of more than 75% of aliphatic units, said aliphatic polyamide being chosen from:

a polyamide denoted A, having a mean number of carbon atoms per nitrogen atom, denoted CA, of from 4 to 8.5, advantageously from 4 to 7;

a polyamide denoted B, having a mean number of carbon atoms per nitrogen atom, denoted CB, of from 7 to 10, advantageously from 7.5 to 9.5;

a polyamide denoted C, having a mean number of carbon atoms per nitrogen atom, denoted CC, of from 9 to 18, advantageously from 10 to 18;

with the proviso that when said layer (4') comprises at least three polyamides, at least one of said polyamides A, B and C is excluded, or said layer (4') is a layer of binder, the thickness of which represents up to 15% of the structure (MLT), said at least one polyamide of said layer (4') being able to be identical or different to said polyamide of the layer (4);

said layer (4') being located between the outer layer (3) and the barrier layer (1) and said layer of binder (4) being located between the barrier layer (1) and the inner layer (2).

The layer (4') may or may not contain a plasticizer. Advantageously, it does not contain plasticizer, just like the layer (2) and the layer (4), the layer (3) being plasticized but thin, as defined above.

In another embodiment, the present invention relates to a multilayer tubular structure (MLT) as defined above, in which the polyamide of the inner layer (2) or the polyamide of the outer layer (3) is a totally aliphatic polyamide, preferably the polyamide of the inner layer (2) and the polyamide of the outer layer (3) are totally aliphatic polyamides.

In another embodiment, the present invention relates to a multilayer tubular structure (MLT) as defined above, in which a second barrier layer (5) is present, said second barrier layer (5) being adjacent, or not adjacent, to the first barrier layer (1), and located below said barrier layer (1).

It may be beneficial, in particular for alcohol-containing petrols, and most particularly for those containing methanol, to place a second barrier layer in order to further limit the diffusion of the petrol into the atmosphere and/or to reduce the content of extractables.

This second barrier layer is different from the first barrier layer (1).

In another embodiment, the present invention relates to a multilayer tubular structure (MLT) as defined above, in which the barrier layer (1) is a layer made of EVOH.

In another embodiment, the present invention relates to a multilayer tubular structure (MLT) as defined above, in which the EVOH is an EVOH comprising up to 27% of ethylene.

In another embodiment, the present invention relates to a multilayer tubular structure (MLT) as defined above, in which the EVOH is an EVOH comprising an impact modifier.

In another embodiment, the present invention relates to a multilayer tubular structure (MLT) as defined above, in which the barrier layer (1) is a layer made of polyphthalamide (PPA).

The term PPA means a composition predominantly based on a polyamide comprising a majority of units which comprise at least one aromatic monomer, in particular polyphthalamide of copolyamide 6.T/x type (in which x denotes one or more comonomers) such as Zytel HTNs from Dupont, such as Grivory HTs from Ems, such as Amodels from Solvay, such as Genestars from Kuraray, such as PPA compositions based on coPA6T/6I, coPA6T/66, coPA6T/6, on coPA6T/6I/66, on PPA9T, on coPPA9T/x, on PPA10T, or on coPPA10T/x.

In another embodiment, the present invention relates to a multilayer tubular structure (MLT) as defined above, in which the barrier layer (1) is a layer made of EVOH and the second barrier layer (5) is a layer made of PPA or fluoropolymer, in particular of ETFE, EFEP or CPT type.

Advantageously, the barrier layer (1) is a layer made of EVOH and the second barrier layer (5) is a layer made of PPA.

In another embodiment, the present invention relates to a multilayer tubular structure (MLT) as defined above, in which the barrier layer (1) is a layer made of EVOH and the second barrier layer (5) is a layer made of PPA.

In another embodiment, the present invention relates to a multilayer tubular structure (MLT) as defined above, in which the barrier layer (1) is a layer made of EVOH and the second barrier layer (5) is a layer made of fluoropolymer, in particular of ETFE, EFEP or CPT type.

Advantageously, in the multilayer tubular structure (MLT) as defined above, the polyamide of the inner layer (2) is a composition based on a polyamide chosen from A, B or C as defined above, in particular PA6, PA66, PA6/66, PA11, PA610, PA612 or PA1012, the corresponding copolyamides and the mixtures of said polyamides or copolyamides, the polyamides obtained from a lactam being advantageously washed.

Advantageously, in the multilayer tubular structure (MLT) as defined above, the polyamide of the outer layer (3) is a polyamide chosen from B or C as defined above, in particular PA11, PA12, PA610, PA612 or PA1012, the corresponding copolyamides and the mixtures of said polyamides or copolyamides, the polyamides obtained from a lactam being advantageously washed.

Advantageously, in the multilayer tubular structure (MLT) as defined above, the polyamide of the inner layer (2) is a composition based on a polyamide chosen from A, B or C as defined above, in particular PA6, PA66, PA6/66, PA11, PA610, PA612 or PA1012, the corresponding copolyamides and the mixtures of said polyamides or copolyamides, the polyamides obtained from a lactam being advantageously washed, and the polyamide of the outer layer (3) is a polyamide chosen from B or C as defined above, in particular PA11, PA12, PA610, PA612 or PA1012, the corresponding copolyamides and the mixtures of said polyamides or copolyamides, the polyamides obtained from a lactam being advantageously washed.

In another embodiment, the present invention relates to a multilayer tubular structure (MLT) as defined below, in which the polyamide of the inner layer (2) or of at least one of the other layers (2) is a conductive polyamide.

When the tubular structure of the invention comprises several layers (2), the conductive layer is the innermost thereof, that is to say that which is in contact with the fluid.

Advantageously, in the multilayer tubular structure (MLT) as defined above, the polyamide of the layer (4) and/or (4') is a mixture of a polyamide having a mean number of carbon atoms per nitrogen atom of 10 or more, and a polyamide having a mean number of carbon atoms per nitrogen atom of 6 or less, for example PA12 and PA6 and an anhydride-functionalized (co)polyolefin.

Advantageously, in the multilayer tubular structure (MLT) as defined above, the polyamide of the layer (4) and/or (4') is chosen from the binary mixtures: PA6 and PA12, PA6 and PA612, PA6 and PA610, PA12 and PA612, PA12 and PA610, PA1010 and PA612, PA1010 and PA610, PA1012 and PA612, PA1012 and PA610, and the ternary mixtures: PA6, PA610 and PA12; PA6, PA612 and PA12; PA6, PA614 and PA12.

In another embodiment, the present invention relates to a multilayer tubular structure (MLT) as defined above, in which at least one of the layers (2), (3), (3'), (4) and (4') comprises at least one impact modifier and/or at least one additive.

Of course, the impact modifier or the additive is not a plasticizer.

Advantageously, the layers (2) and (3) comprise at least one impact modifier and/or at least one additive.

Advantageously, the layers (2), (3) and (3') comprise at least one impact modifier and/or at least one additive.

Advantageously, the layers (2), (3), (3') and (4') comprise at least one impact modifier and/or at least one additive.

Advantageously, the layers (2), (3), (3') (4) and (4') comprise at least one impact modifier and/or at least one additive.

In another embodiment, the present invention relates to a multilayer tubular structure (MLT) as defined above, in which the structure comprises three layers in the following order: (3)//(1)//(2), the layers (3) and/or (2) containing no more than 1.5% by weight of plasticizer relative to the total weight of the composition of each layer, in particular the layer (3) and/or (2) does not (do not) contain plasticizer.

In another embodiment, the present invention relates to a multilayer tubular structure (MLT) as defined above, in which the structure comprises four layers in the following order: (3')//(3)//(1)//(2), the layer (3') being as defined above, the layer (2) and/or (3) containing no more than 1.5% by weight of plasticizer relative to the total weight of the composition of each layer, in particular the layer (2) and/or (3) does not (do not) contain plasticizer.

In another embodiment, the present invention relates to a multilayer tubular structure (MLT) as defined above, in which the structure comprises five layers in the following order:

(3')//(3)//(1)//(5)//(2) in which the layer (1) is a layer of EVOH, the layer (5) is a layer of PPA, the layer (2) containing no more than 1.5% by weight of plasticizer relative to the total weight of the composition of each layer, in particular the layer (2) does not contain plasticizer, the layer (3) and (3') comprising plasticizer; or (3')//(3)//(1)//(2)//(5) in which the layer (1) is a layer of EVOH, the layer (5) is a layer of PPA, the layer (2) containing no more than 1.5% by weight of plasticizer relative to the total weight of the composition of each layer, in particular the layer (2) does not contain plasticizer, the layer (3) and (3') comprising plasticizer; or (3')//(4)//(1)//(4)//(2) in which the layer (3) is as defined in Claim 3, the layer (2) and (4) containing no more than 1.5% by weight of plasticizer relative to the total weight of the composition of each layer, in particular the layer (2) and/or (4) does not (do not) contain plasticizer, the layer (4') comprising plasticizer, in particular the layer (4') does not contain plasticizer.

According to another embodiment, the present invention relates to a multilayer tubular structure (MLT) as defined above, in which the structure comprises the layers in the following order:

(3')//(3)//(4')//(1)//(4)//(2) in which the layers (3) and (3') are as defined above, the layer (2) and (4) containing no more than 1.5% by weight of plasticizer relative to the total weight of the composition of each layer, in particular the layer (2) and/or (4) does not (do not) contain plasticizer, the layer (4') comprising plasticizer, in particular the layer (4') does not contain plasticizer.

In particular, said layer (3') of the above six-layer structure is plasticized, said plasticizer being in particular present in a proportion of 1.5% to 15% by weight relative to the total weight of the composition of said layer, the thickness of said layer (3') preferably represents up to 20% of the total thickness of the tubular structure, in particular up to 200 μm, in particular the layer (3') is the outermost layer and is the only plasticized layer, the layer(s) (3) containing no plasticizer.

According to another aspect, the present invention relates to the use of a multilayer tubular structure MLT as defined above for the transport of fuels, in particular of petrol.

According to another aspect, the present invention relates to the use of a multilayer tubular structure MLT as defined above, to comply with an extractables test, said test consisting especially in filling said multilayer tubular structure MLT with alcohol-containing petrol of FAM B type and in heating everything at 60° C. for 96 hours, then in emptying it by filtering it into a beaker, then in leaving the filtrate of the beaker to evaporate at room temperature, to finally weigh this residue, the proportion of which must be less than or equal to 6 g/m2 of tube inner surface area.

All the variants described for the multilayer tubular structure MLT apply here for the use of said multilayer tubular structure MLT for complying with said extractables test.

An extractables value of less than or equal to approximately 6 g/m2 of tube inner surface area indicates that the proportion of extractables is very low and will thus avoid clogging the injectors.

EXAMPLES

The invention will now be described in more detail by means of the following non-limiting examples.

The following structures were prepared by extrusion:

The multilayer tubes are produced by coextrusion. A McNeil multilayer extrusion industrial line is used, equipped with 5 extruders connected to a multilayer extrusion head with spiral mandrels.

The screws used are single extrusion screws having screw profiles adapted to the polyamides. In addition to the 5 extruders and the multilayer extrusion head, the extrusion line comprises:

- a die-punch assembly, located at the end of the coextrusion head; the inside diameter of the die and the outside diameter of the punch are chosen as a function of the structure to be made and of the materials of which it is composed, and also as a function of dimensions of the pipe and of the line speed;
- a vacuum tank with an adjustable level of vacuum. In this tank circulates water maintained in general at 20° C., into which is immersed a gauge for conforming the tube to its final dimensions. The diameter of the gauge is adapted to the dimensions of the tube to be made, typically from 8.5 to 10 mm for a tube with an outside diameter of 8 mm and a thickness of 1 mm;
- a succession of cooling tanks in which water is maintained at about 20° C., for cooling the tube along the path from the drawing head to the drawing bench;
- a diameter measurer;
- a drawing bench.

The configuration with 5 extruders is used to make tubes ranging from 2 layers to 5 layers. In the case of the structures in which the number of layers is less than 5, several extruders are then fed with the same material.

In the case of the structures comprising 6 layers, an additional extruder is connected and a spiral mandrel is added to the existing head, with a view to producing the inner layer in contact with the fluid.

Before the tests, in order to ensure the best properties for the tube and a good extrusion quality, it is verified that the extruded materials have a residual moisture content before extrusion of less than 0.08%. If this is not the case, an additional step of drying the material before the tests is carried out, generally in a vacuum dryer, overnight at 80° C.

The tubes, which satisfy the characteristics described in the present patent application, were taken, after stabilization of the extrusion parameters, the nominal dimensions of the tubes no longer changing over time. The diameter is monitored by a laser diameter measurer installed at the end of the line.

Generally, the line speed is typically 20 m/min. It generally varies between 5 and 100 m/min.

The speed of the extruder screws depends on the thickness of the layer and on the diameter of the screw, as is known to those skilled in the art.

In general, the temperature of the extruders and tools (head and joint) should be set so as to be sufficiently higher than the melting point of the compositions under consideration, such that they remain in the molten state, thus preventing them from solidifying and blocking the machine.

The tubular structures were tested on different parameters (Table I).

The amount of extractables was determined and the barrier, and also impact and bursting strength properties were evaluated. Table II indicates the tests used and the classification of the results.

TABLE I

| Examples and counter-examples | Extractables | Barrier | Impact | Bursting strength (1) |
|---|---|---|---|---|
| Counter-example 1: PA12-TL/binder/EVOH/binder/PA12-TL 400/50/150/50/350 µm | >50 | Good | Good | Good |
| Counter-example 2: PA12-TL/binder/EVOH/binder-Noplast/PA12-TL 400/50/150/50/350 µm | >50 | Good | Good | Good |
| Counter-example 3: PA12-NoPlast/binder-NoPlast/EVOH/binder-NoPlast/PA12-TL 400/50/150/50/350 µm | >50 | Good | Good | Good |
| Counter-example 4: PA12-NoPlast/binder-NoPlast/EVOH/binder-no-plast/PA11-TL 400/50/150/50/350 µm | >30 | Good | Good | Good |
| Counter-example 5: PA12-NoPlast/binder-NoPlast/EVOH/binder-no-plast/PA610-TL 400/50/150/50/350 µm | >30 | Good | Good | Good |
| Ex.1: PA12-NoPlast/binder-NoPlast/EVOH/binder-NoPlast/PA610-NoPlast 400/50/150/50/350 µm | <5.5 | Good | Good | Good |
| Ex.2: PA12-NoPlast/binder-NoPlast/EVOH/binder-NoPlast/PA612-NoPlast 400/50/150/50/350 µm | <6 | Good | Good | Good |
| Ex. 3 PA12-NoPlast/binder-NoPlast/EVOH/binder-NoPlast/coPA612-6T-NoPlast 400/50/150/50/350 µm | <6 | Good | Good | Good |
| Ex. 4 PA12-NoPlast/binder-NoPlast/EVOH/PA6-NoPlast 400/50/150/400 µm | <6 | Good | Good | Good |
| Ex. 5 PA12-NoPlast/binder-NoPlast/EVOH/PA610-NoPlast 400/50/150/400 µm | <5.5 | Good | Good | Good |
| Ex. 6 PA610-NoPlast/EVOH/PA610-NoPlast 450/150/400 µm | <5.5 | Good | Borderline | Very good |
| Ex. 7 PA11-TL/PA610-NoPlast/EVOH/PA610-NoPlast 150/300/150/400 µm | <5.5 | Good | Good | Very good |
| Ex. 8 PA11-TL/PA610-NoPlast/EVOH/PA610-NoPlast/PA11-NoPlast 150/300/150/250/150 µm | <5.5 | Good | Very good | Very good |
| Ex. 9 PA12-NoPlast/binder-NoPlast/EVOH/binder-NoPlast/PA610-NoPlast 550/50/150/50/200 µm | <4.5 | Good | Borderline | Good |
| Ex. 10 PA12-NoPlast/binder-NoPlast/EVOH24/binder-NoPlast/PA610-NoPlast 400/50/150/50/350 µm | <5.5 | Very good | Good | Good |
| Ex. 11 PA12-NoPlast/binder-NoPlast/EVOHhi/binder-NoPlast/PA610-NoPlast (550/50/150/50/200 µm) | <4.5 | Good | Good | Good |
| Ex. 12 PA12-TL/binder/EVOHhi/binder-NoPlast/PA610-NoPlast 550/50/150/50/200 µm | <5.5 | Good | Good | Good |
| Ex. 13 PA12-TL/binder2/EVOHhi/binder2-NoPlast/PA610-NoPlast 550/50/150/50/200 µm | <5.5 | Good | Good | Good |
| Ex. 14 PA12-TL/binder/EVOHhi/binder-NoPlast/PA612-NoPlast 550/50/150/50/200 µm | <6 | Good | Good | Good |

TABLE I-continued

| Examples and counter-examples | Extractables | Barrier | Impact | Bursting strength (1) |
|---|---|---|---|---|
| Ex. 15 PA12-TL/PPA1OT/PA11-NoPlast 600/250/150 μm | <5 | Borderline | Good | Good |
| Ex. 16 PA12-TL/binder/EVOH/PA610-NoPlast/PPA1OT 350/50/100/400/100 μm | <3 | Very good | Good | Very good |
| Ex. 17 PA12-TL/binder/EVOH/PPA10T/PA610-NoPlast 350/50/100/100/400 μm | <5.5 | Very good | Good | Very good |
| Ex. 18 PA12-TL/binder/EVOH/PA610-NoPlast/EFEPc 350/50/100/400/100 μm | <3 | Very good | Good | Very good |
| Ex. 19 PA11-TL/PA610-NoPlast/EVOH/PA610-NoPlast/PA11cond-NoPlast 400/50/150/300/100 μm | <5.5 | Good | Borderline | Very good |

(1) Bursting strength is the bursting strength after at least 96 h with FAM B biofuel inside; thus, a sufficiently high value to withstand the pressure is sought.

TABLE II

| Properties | Very good (VG) | Good (G) | Borderline (QG) | Poor (P) |
|---|---|---|---|---|
| CE10 bio-petrol barrier, 60° C. g/m² · 24 h, 150 μm thick barrier | <0.2 | 0.2-1 | 1-3 | >3 |
| Extractables: this test consisting of a tube filled with alcohol-containing petrol of FAM B type at 60° C. for 96 hours, then emptied and filtered into a beaker, which is then left to evaporate and the residue of which is weighed, the latter having to be less than or equal to 6 g/m² (of tube inner surface area). | <4.5 g/m² of tube surface area (inner surface area inn) | 4.5-5.5 g/m² of tube surface area (inner surface area inn) | 5.5-6 g/m² of tube surface area (inner surface area inn) | >6 g/m² of tube surface area (inner surface area inn) |
| Impact VW-40° C. Standard VW TL52435 2010 | <4% breakage | <11% breakage | <21% breakage | >22% breakage |
| Bursting strength after ageing, standard VW TL52435 2010 | >30 N/mm² (MPa) | 30-27 N/mm² (MPa) | 27-25 N/mm² (MPa) | <25 N/mm² (MPa) |

The measurements of permeability to petrols (bio-petrol barrier) are determined at 60° C. according to a gravimetric method with CE10: isooctane/toluene/ethanol=45/45/10 vol %.

The instantaneous permeability is zero during the induction period, then it gradually increases up to an equilibrium value which corresponds to the permeability value under continuous operating conditions. This value, obtained under continuous operating conditions, is considered to be the permeability of the material.

Compositions

PA12-TL: denotes a composition based on polyamide 12, of Mn (number-average molecular weight) 35 000, containing 6% of BBSA (benzyl butyl sulphonamide) plasticizer and 6% of anhydride-functionalized EPR Exxelor VA1801 (Exxon), and on 1.2% of organic stabilizers (consisting of 0.8% of phenol Lowinox 44B25 from Great Lakes, of 0.2% of phosphite Irgafos 168 from Ciba, of 0.2% of UV stabilizer Tinuvin 312 from Ciba). The melting point of this composition is 175° C.

PA12-NoPlast=PA12-TL without plasticizer (the latter is replaced by the same % of PA12)

PA11-TL: denotes a composition based on polyamide 11, of Mn (number-average molecular weight) 29 000, containing 5% of BBSA (benzyl butyl sulphonamide) plasticizer, 6% of impact modifier of ethylene/ethyl acrylate/anhydride type in the weight ratio 68.5/30/1.5 (MFI 6 at 190° C. under 2.16 kg), and on 1.2% of organic stabilizers (consisting of 0.8% of phenol Lowinox 44B25 from Great Lakes, of 0.2% of phosphite Irgafos 168 from Ciba, of 0.2% of UV stabilizer Tinuvin 312 from Ciba). The melting point of this composition is 185° C.

PA11-NoPlast=PA11-TL without plasticizer (the latter is replaced by PA11)

PA610-TL=PA610+12% impact modifier EPR1+organic stabilizer+10% plasticizer

PA610-NoPlast=PA610-TL without plasticizer (the latter is replaced by PA610)

PA612-TL=PA612+12% impact modifier EPR1+organic stabilizer+9% plasticizer

PA612-NoPlast=PA612-TL without plasticizer (the latter is replaced by PA612)

PA6-TL=PA6+12% impact modifier EPR1+organic stabilizer+12% plasticizer

PA6-NoPlast=PA6-TL without plasticizer (the latter is replaced by PA6)

PA12: Polyamide 12, of Mn (number-average molecular weight) 35 000. The melting point is 178° C., the enthalpy of fusion thereof is 54 kJ/m²
  PA11: Polyamide 11, of Mn (number-average molecular weight) 29 000. The melting point is 190° C., the enthalpy of fusion thereof is 56 kJ/m²
  PA610: Polyamide 6.10, of Mn (number-average molecular weight) 30 000. The melting point is 223° C., the enthalpy of fusion thereof is 61 kJ/m²
  PA612: Polyamide 6.12, of Mn (number-average molecular weight) 29 000. The melting point is 218° C., the enthalpy of fusion thereof is 67 kJ/m²
  PA6: Polyamide 6, of Mn (number-average molecular weight) 28 000. The melting point is 220° C., the enthalpy of fusion thereof is 68 kJ/m²
  EPR1: Denotes an EPR functionalized with an anhydride-functional reactive group (at 0.5-1% by weight), MFI 9 (at 230° C., under 10 kg), of Exxellor VA1801 type from Exxon.

Organic stabilizer=1.2% of organic stabilizers consisting of 0.8% of phenol (Lowinox 44B25 from Great Lakes), of 0.2% of phosphite (Irgafos 168 from Ciba), of 0.2% of UV stabilizer (Tinuvin 312 from Ciba).

Plasticizer=BBSA (benzyl butyl sulphonamide)

coPA612-6T-NoPlast=coPA6.12/6.T with 20 mol % of 6.T (thus 80 mol % of 6.12) (this coPA has MFI 235° C., 5 kg=(T° melting=200° C.)+20% EPR1+orga. stab.)

PPA10T=coPA10.T/6.T, of 60/40 molar ratio, T melting 280° C.+18% EPR1+orga. stab.

PA11cond-noplast=PA11, of Mn 15 000+9% EPR1+22% of Ensaco 200 type carbon black

Binder=Composition based on 43.8% PA612 (as defined elsewhere), on 25% of PA6 (as defined elsewhere) and on 20% of EPR1 type impact modifier, and on 1.2% of organic stabilizers (consisting of 0.8% of phenol Lowinox 44B25 from Great Lakes, of 0.2% of phosphite Irgafos 168 from Ciba, of 0.2% of UV stabilizer Tinuvin 312 from Ciba), and on 10% of BBSA (benzyl butyl sulphonamide) plasticizer.

Binder-NoPlast=Composition based on 48.8% PA612 (as defined elsewhere), on 30% of PA6 (as defined elsewhere) and on 20% of EPR1 type impact modifier, and on 1.2% of organic stabilizers (consisting of 0.8% of phenol Lowinox 44B25 from Great Lakes, of 0.2% of phosphite Irgafos 168 from Ciba, of 0.2% of UV stabilizer Tinuvin 312 from Ciba).

Binder2=Composition based on 43.8% PA610 (as defined elsewhere), on 25% of PA6 (as defined elsewhere) and on 20% of EPR1 type impact modifier, and on 1.2% of organic stabilizers (consisting of 0.8% of phenol Lowinox 44B25 from Great Lakes, of 0.2% of phosphite Irgafos 168 from Ciba, of 0.2% of UV stabilizer Tinuvin 312 from Ciba), and on 10% of BBSA (benzyl butyl sulphonamide) plasticizer.

Binder2-NoPlast=Composition based on 48.8% PA610 (as defined elsewhere), on 30% of PA6 (as defined elsewhere) and on 20% of EPR1 type impact modifier, and on 1.2% of organic stabilizers (consisting of 0.8% of phenol Lowinox 44B25 from Great Lakes, of 0.2% of phosphite Irgafos 168 from Ciba, of 0.2% of UV stabilizer Tinuvin 312 from Ciba).

EVOH=EVOH containing 32% of ethylene, EVAL FP101B type (Eval)

EVOH24=EVOH containing 24% of ethylene, EVAL M100B type (Eval)

EVOHhi=EVOH containing 27% of ethylene and impact modifier, EVAL LA170B type (Eval)

PPA10T/6T=coPA10.T/6.T with 40 mol % of 6.T (of MFI 300° C., 5 kg=8, and of 1° C. melting 280° C.)+15% of EPR1+orga. stab.)

EFEPc=functionalized and conductive EFEP of Neoflon RP5000AS type, from Daikin

Binder PA610+PA6. Denotes a composition based on PA612 (of Mn 29000, and as defined elsewhere) and on 36% of PA6 (of Mn 28 000, and as defined elsewhere), and on 1.2% of organic stabilizers (consisting of 0.8% of phenol Lowinox 44B25 from Great Lakes, of 0.2% of phosphite Irgafos 168 from Ciba, of 0.2% of UV stabilizer Tinuvin 312 from Ciba). The structures having layers not containing plasticizer, located below the barrier and especially in contact with the fluid, have excellent results in the extractables test, much better than the counter-examples in which the layer in contact with the fluid is plasticized.

The invention claimed is:

1. A multilayer tubular structure (MLT) intended for the transport of fuels, wherein the MLT consists of the following five layers, from the outside inwards: a first outer layer (3), a second outer layer (3') in contact with and inside of the first outer layer (3), a barrier layer (1) in contact with and inside of the second outer layer (3'), a first inner layer (2) in contact with and inside of the barrier layer (1), and a second inner layer (2') in contact with and inside of the first inner layer (2), wherein:

the barrier layer (1) comprises EVOH or comprises PPA;

the first inner layer (2) comprises a polyamide, where the polyamide is chosen from the group consisting of PA6, PA66, PA6/66, PA610, PA612, PA1012, the corresponding copolyamides thereof, and mixtures thereof;

the second outer layer (3') comprises at least one aliphatic polyamide of aliphatic type or comprising more than 75% of aliphatic units;

the first outer layer (3) comprises plasticizer in a proportion from 1.5% to 15% by weight relative to the total weight of the composition of the first outer layer, and the thickness of the first outer layer comprises up to 20% of the total thickness of the multilayer tubular structure;

the second inner layer (2') comprises a polyamide as defined for the first inner layer (2) but different from that of the first inner layer (2); and the second outer layer (3'), the barrier layer (1), the first inner layer (2) and the second inner layer (2') do not comprise plasticizer.

2. The MLT according to claim 1, wherein the polyamide of the second outer layer (3') is a totally aliphatic polyamide.

3. The MLT according to claim 1, wherein the barrier layer (1) comprises EVOH, and the EVOH comprises up to 27% of ethylene.

4. The MLT according to claim 1, wherein the barrier layer (1) comprises EVOH, and the EVOH further comprises an impact modifier.

5. The MLT according to claim 1, wherein the polyamide of the second outer layer (3') is chosen from the group consisting of PA11, PA12, PA610, PA612, PA1012, the corresponding copolyamides thereof, and mixtures thereof.

6. The MLT according claim 1,
wherein the polyamide of the second outer layer (3') is chosen from the group consisting of PA11, PA12, PA610, PA12, PA1012, the corresponding copolyamides and mixtures therefore.

7. The MLT according to claim 1, wherein the polyamide of at least one of the layers is a conductive polyamide.

8. The MLT according to claim 1, wherein at least one of the first inner layer (2) and the second outer layer (3'), comprises at least one of an impact modifier and at least one other additive.

9. The MLT according to claim 1, wherein the at least one aliphatic polyamide of the first inner layer (2) includes two polyamides selected from the group consisting of: PA6, PA66, PA6/66, PA610, PA612 and PA1012.

10. A method of transporting fuel, wherein the method comprises filling the MLT according to claim 1 with fuel and then transporting the MLT from one location to another.

* * * * *

UNITED STATES PATENT AND TRADEMARK OFFICE
CERTIFICATE OF CORRECTION

PATENT NO. : 11,339,899 B2
APPLICATION NO. : 15/558358
DATED : May 24, 2022
INVENTOR(S) : Thibaut Montanari et al.

It is certified that error appears in the above-identified patent and that said Letters Patent is hereby corrected as shown below:

In the Claims

Column 20, Lines 42-46, Claim 6 should be corrected to read:
--6. The MLT according to claim 1, wherein the polyamide of the second outer layer (3') is chosen from the group consisting of PA11, PA12, PA610, PA612, PA1012, the corresponding copolyamides and mixtures thereof.--

Signed and Sealed this
Ninth Day of August, 2022

Katherine Kelly Vidal
*Director of the United States Patent and Trademark Office*